United States Patent [19]

Caire et al.

[11] Patent Number: 5,663,962
[45] Date of Patent: Sep. 2, 1997

[54] METHOD OF MULTIPLEXING STREAMS OF AUDIO-VISUAL SIGNALS CODED ACCORDING TO STANDARD MPEG1

[75] Inventors: Giovanni Caire, Turin; Giampaolo Michieletto, Robegano, both of Italy

[73] Assignee: Cselt- Centro Studi E Laboratori Telecomunicazioni S.p.A., Turin, Italy

[21] Appl. No.: 529,096

[22] Filed: Sep. 15, 1995

[30] Foreign Application Priority Data

Sep. 29, 1994 [IT] Italy ................................. TO94A0758

[51] Int. Cl.$^6$ ................................................ H04J 3/14
[52] U.S. Cl. ..................... 370/535; 370/536; 370/542; 370/229; 395/877; 348/419
[58] Field of Search .................................. 370/13, 82, 17, 370/99, 112, 79, 118, 83, 84, 110.1, 58.1, 58.2, 60, 66, 68.1, 229, 230, 232, 235, 537, 538, 539, 540, 541, 535, 536, 542, 543, 544, 474, 476; 395/849, 850, 872, 873, 877; 364/239.6; 348/419, 584, 426, 473

[56] References Cited

U.S. PATENT DOCUMENTS 5,159,447 10/1992 Haskell et al. .......................... 348/419
5,481,543 1/1996 Veltman ................................. 370/112
5,534,944 7/1996 Egawa et al. ........................ 370/94.1

OTHER PUBLICATIONS

"Information Technology—Coding Of Moving Pictures And Associated Audio For Digital Starage Media At Up To About 1,5 MBIT/S" Part 1:Systems; Ref.# ISO/IEC 11172-1:1993(E); 15 pages.

*Primary Examiner*—Wellington Chin
*Assistant Examiner*—Huy D. Vu
*Attorney, Agent, or Firm*—Herbert Dubno

[57] ABSTRACT

The method allows performing the multiplexing of audio-visual streams, coded according to standard MPEG1, to be sent to remote equipment where demultiplexing and decoding occur. The method takes into account the trend of the occupancy of the input buffers of the remote decoders in order to avoid possible underflow or overflow conditions. For this purpose a multiplexed stream is constructed, composed of packets of variable sizes, by choosing the streams on the basis of the urgency to receive data that the demultiplexing buffers BDi have in order not to become empty.

12 Claims, 7 Drawing Sheets

METHOD OF MULTIPLEXING STREAMS OF AUDIO-VISUAL SIGNALS CODED ACCORDING TO STANDARD MPEG1

FIELD OF THE INVENTION

The invention described herein refers to digital recording of moving pictures and associated audio and, more particularly to a method of multiplexing streams of digitally coded audio-visual signals, in particular signals coded in accordance with standard ISO/IEC 11172.

BACKGROUND OF THE INVENTION

In the past few years numerous services, offered by both private and public suppliers, have received widespread acceptance. These services, known as "multimedia" services, provide video information, including sequences of moving pictures, still pictures, text, sound information and other data. Among these services, the so called "Video on demand" is quite important: it allows the user to select movies from his own home at any time, with no need to follow a predetermined viewing schedule. Other services include broadcasting of advertising videos, didactic or teleworking-related videos, etc.

For these applications it is necessary to convert into digital form the signals generated from the various sources, which entails the need to process, store and transfer large amounts of data. Given the limited capacities of current transmission and recording supports, it is therefore necessary to have a coding method which allows elimination of all the information that is not strictly necessary for the good quality of the presentation.

For that purpose, various coding methods have been defined among which are standard ISO/IEC 11172, also known as the MPEG1 standard from the initials of the Moving Picture Expert Group which has developed it.

When a sequence of moving pictures and associated audio, recorded in a centralized file, is to be presented at a remote terminal, it is necessary to process audio and video information simultaneously. The two kinds of information must therefore be joined into a single digital stream with a multiplexing process. For the presentation to the user, video and audio information have to be separated again, by an inverse or demultiplexing process, as presentation occurs on different devices (monitor, loudspeaker).

In general, when it is desired for instance to insert into the complete stream also some subtitles to be displayed during the presentation, or when the possibility is envisaged of offering the user more than one audio channel, the multiplexing/demultiplexing processes must allow operating on more than two input streams.

A complete system for producing an MPEG1-coded stream therefore comprises several input streams, each related to a certain type of information. Each stream is generated by a source (TV camera, microphone, etc.) and is coded according to the aforesaid standard. Downstream of the coders, the individual streams are multiplexed into a single output stream.

Analogously, the decoding system includes a demultiplexer, which extracts the individual streams and routes them to the respective decoders. Here, the different signals are converted again to their original form and are then passed on to the presentation devices.

The multiplexing process adopted according to the MPEG1 standard is a time-division multiplexing process. The overall stream is structured as a sequence of intervals called packets, each of which contains data of a single type, indicated in a header of the packet itself.

For each interval, the multiplexer has to decide from which input stream it should take the data in order to construct the packets. The MPEG1 standard imposes no restrictions on this choice, with the only constraint that the stream produced is to be decoded without bringing a model decoder, defined in the standard, to conditions where data underflow or overflow occur in its input buffers.

Paragraph 5 of Annex A of document ISO/IEC 11172 defining the above mentioned MPEG1 standard, reports by way of example a multiplexing method which utilizes a strategy called "Proportional rate" strategy. This strategy is based on a fixed and cyclically repeated scheme for choosing the streams to be multiplexed. Within this scheme, each elementary stream is assigned a number of packets that is proportional to its nominal bit rate. In this way, the average frequency of each elementary stream within the complete stream is equal to the nominal bit rate, over a time interval that is as short as possible.

The limitation of this process is due to the fact that the actual bit rates of the incoming streams in reality are not constant, but rather fluctuate around their nominal values. This is mainly due to the fact that the coded pictures have sizes, in terms of bit number, that can substantially vary for reasons intrinsic to the coding process, while their durations (time interval during which a picture is visualized) are fixed. It is therefore clear that the presence of a certain number of "large" pictures close to one another within the sequence causes the decoder to extract, from its input buffer, data at higher speed than the nominal bit rate of the video stream, thus creating underflow problems. Analogously, the presence of several "small" pictures close to one another may bring about overflow problems.

These drawbacks are obviated by the method according to the present invention, which takes into account the trends of the amounts of data in the decoder input buffers, thus avoiding possible underflow and overflow conditions. Furthermore, this method can be applied to any number of input streams without introducing particular complications in constructing the multiplexed stream.

SUMMARY OF THE INVENTION

In particular, the present invention provides a method of multiplexing digitally coded multimedia signal streams. More particularly, the invention is a method of multiplexing N elementary streams of digitally coded data representing information associated to multimedia signal sequences, to build a multiplexed stream which is composed of packets containing data from a single stream and is transmitted at a bit rate R to a remote demultiplexer (DM) capable of driving N decoders (DC1 ... DCN), each decoder being allotted to one of the elementary streams and being connected downstream of a respective demultiplexing buffer (BD1 ... BDN), into which data of a packet are sequentially written and from which blocks of coded data of size $D^i h$ (hereinafter referred to as access units) are simultaneously extracted at decoding instants $t^i h$. The method comprises the following steps for each input stream $S^i$:

(a) evaluating, at a current instant $t_c$, the amount of data $A^i(t_c)$ already arrived at the multiplexing buffer (BDi) and the amount of data $E^i(t_c)$ already extracted from the demultiplexing buffer (BDi), where $E^i(t_c) = \Sigma D^i h$, h being such that $t^i h < t_c$;

(b) evaluating the amount of data $BF^i(t_c)$ contained at the current instant $t_c$ in the demultiplexing buffer (BDi) as the difference $BF^i(t_c)=A^i(t_c)-E^i(t_c)$ between the data arrived and the data extracted up to instant $t_c$;

(c) evaluating, for a number K of next access units not yet decoded at the current instant $t_c$, a parameter $X^i$ (hereinafter referred to as a "relax") linked to the buffer occupancy level and representative of the urgency the buffer (BDi) has to receive data to a void occurrence of underflow conditions upon extraction of one of the access unit;

(d) identifying stream $S^I$ having the minimum relax;

(e) constructing a packet containing a predetermined number P of data bytes of the elementary stream $S^I$ having the minimum relax.

The relax $X^i$ for stream $S^i$ can be evaluated according to relation $$X^i=\min \{(t^ik-t_c)-[E^i(t^ik)-A^i(t_c)]/R\},$$

where:

min indicates the minimum of the quantity between braces;

$t^ik$ (1<k<K) is the extraction instant of the k-th next access unit, and $E^i(t^ik)$ is given by $E^i(t_c)+\Sigma D^i_m$(m<1<k).

After identification of the stream $S^I$ having the minimum relax, a check is made on whether buffer underflow conditions would occur, for another elementary stream $S^i$ of which the relax is higher than the minimum, during a time interval starting at the current instant $t_c$ and having a duration (T) equal to the time required to transmit a packet containing P databytes and H header bytes at bit rate R, and in that the packet containing the predetermined number P of data of the elementary stream $S^I$ having the minimum relax is built if the check has given negative result, whereas a packet containing a reduced number P' of data bytes of the other elementary stream $S^j$ is built if the check has given positive result. This reduced number P' can be such that the time T' required to transmit a packet of size P'+H at bit rate R is less than the minimum relax. This reduced number P' is $P'=E^j[t_c+(P+H)/R]-A^j(t_c)$.

The relax evaluation for an elementary stream can be carried out only if writing a packet containing data of that stream into the demultiplexing buffer does not cause overflow in the buffer itself. If overflow would occur for all streams, a padding packet without information content is built and inserted into the multiplexed stream.

After construction of a packet at instant $t_c$, the evaluations are repeated at an instant $t_c+(P^*+H)/R$, P* having value p or P' depending on whether the packet itself has been built with data of the stream $S^I$ with minimum relax or of the other stream $S^j$. At instant t=0,$A^i(0)$ is set to 0, for each I, for initialization purposes. The number K of next access units not yet decoded as of the current instant $t_c$ preferably is 3. The predetermined number P of data bytes in the packet can be about 2048 and the streams are coded according to standard ISO/IEC 11172 (standard MPEG1).

BRIEF DESCRIPTION OF THE DRAWINGS

These and other characteristics of the present invention will be better clarified by the following description of a preferred embodiment of the same, given by way of non-limiting example, and by the accompanying drawing in which.

SPECIFIC DESCRIPTION

Figure 1:
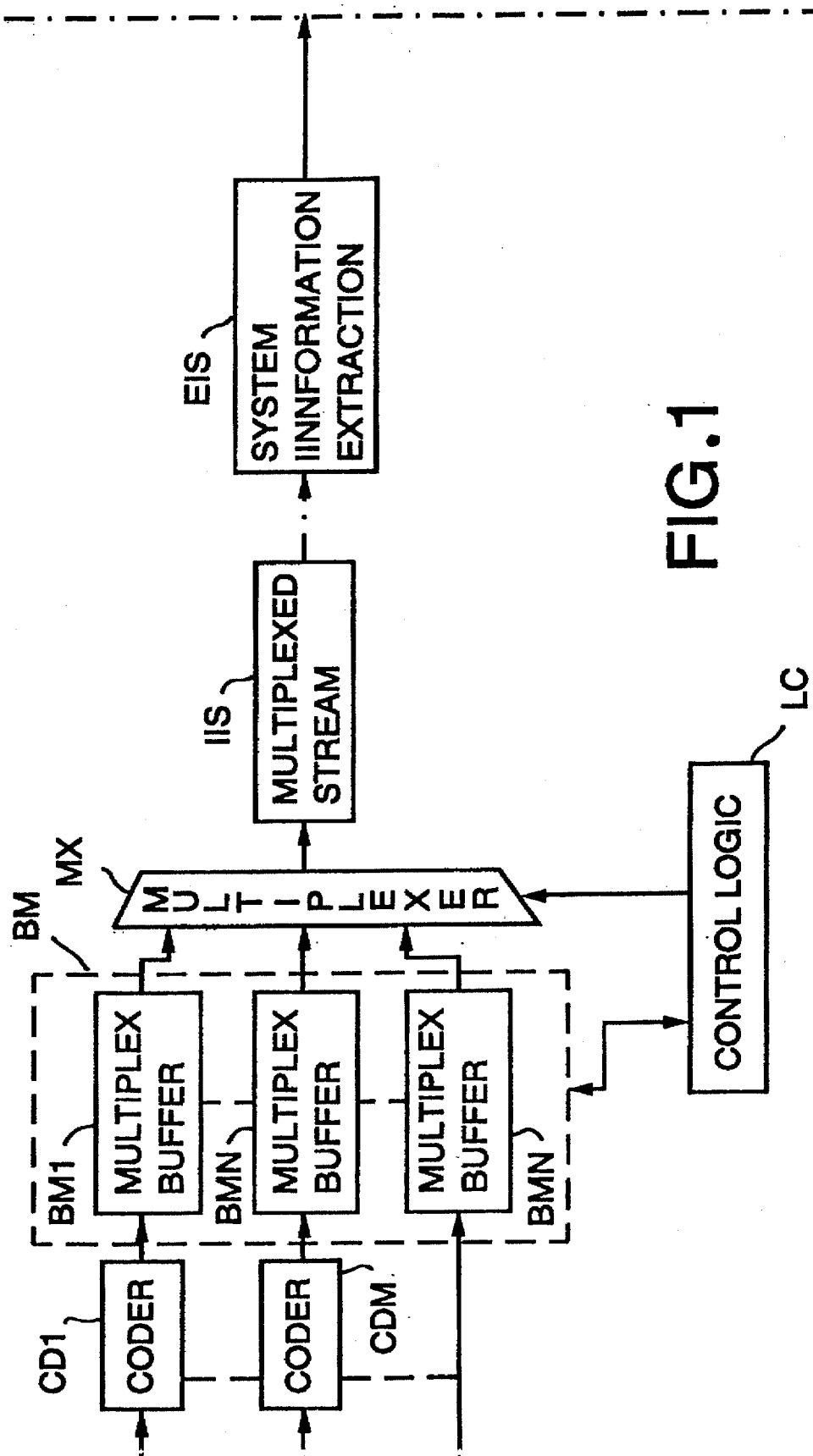
FIG. 1 is a schematic representation of a system for transmitting-receiving coded audio-visual streams.
Figure 1A:
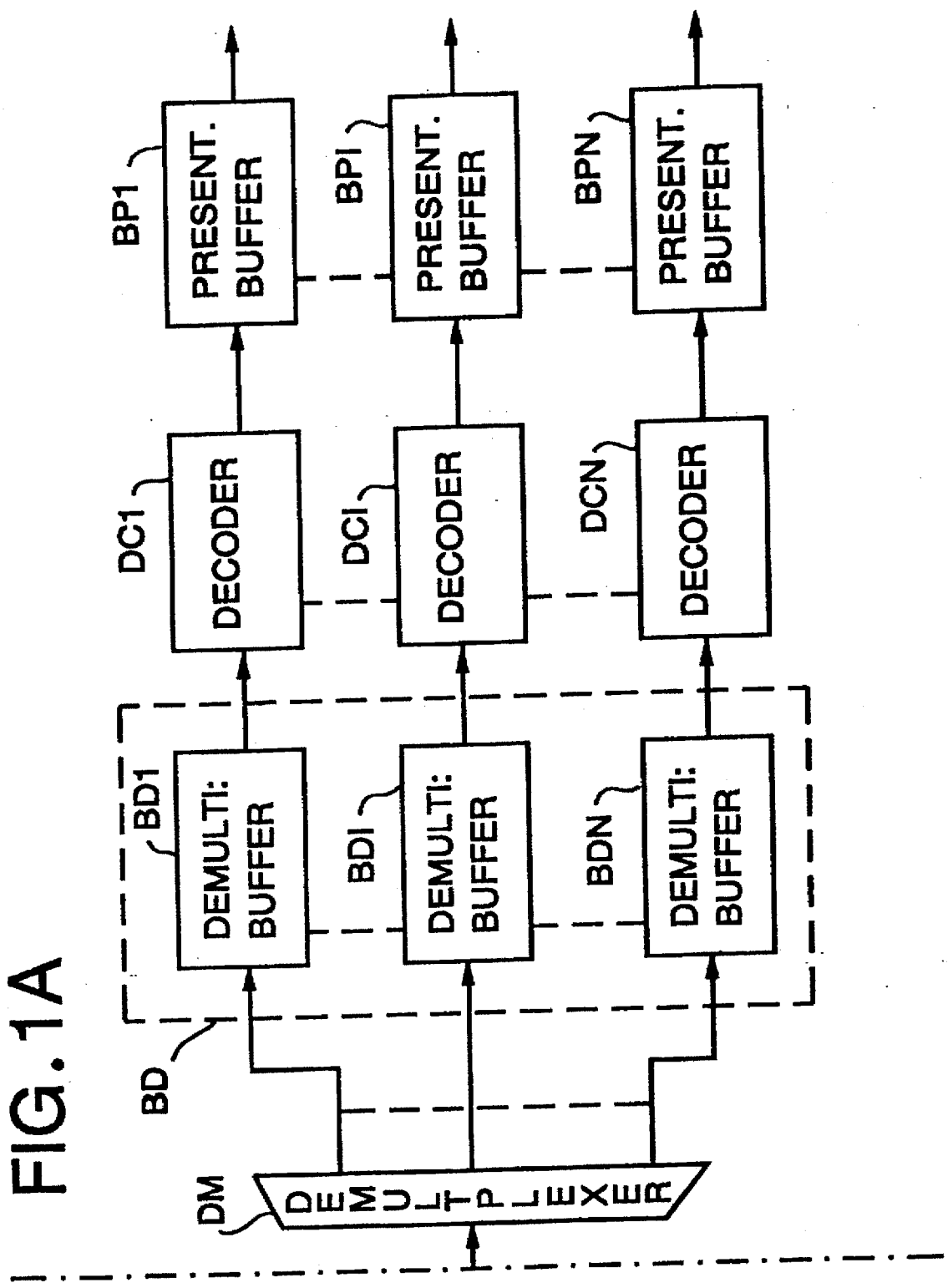

FIG. 1 schematically shows the structure of a system for transmitting and receiving streams of digitally coded multimedia signals organized according to standard MPEG1.

In the most general case, the transmitter will have to transmit a coded stream by combining the data of N input streams each related to a certain type of information, for instance, one or more video streams, the associated audio streams and one or more streams of other kinds of signals (e.g. text) which possibly are not coded according to the standard.

The input streams to be coded (generally, the audio and video streams) coming from respective sources (not shown), are sent to respective coders CD1 ... CDM which code them as required by the standard and emit compressed audio and video streams having respective nominal bit rates $\overline{R1}$ ... $\overline{RM}$. The compressed streams are fed to multiplexing buffers BM1 ... BMM which are to compensate bit rate fluctuations about the nominal values. Further multiplexing buffers, like that shown at BMN in the drawing, are intended for the temporary storage of the streams which do not require MPEG1-coding. Buffers BM1 ... BMN may be different areas of a single storage device BM. The buffer outputs are connected to a multiplexer MX which is to form a multiplexed stream under the control of a control logic LC. Information required by the so-called system level of standard MPEG1 (including, for instance, synchronism information) will be joined to the multiplexed stream, as schematized by block IIS, and the complete stream is forwarded onto a transmission line. The system level is not concerned by the present invention, and therefore the structure and the tasks of block IIS need not to be described in detail.

The multiplexed stream has a constant bit rate $R=(1+\alpha)\Sigma \overline{Ri}$(1<i<N), where $\alpha$ is the overhead factor due to the system information and $\overline{Ri}$ is the nominal bit rate of the generic elementary stream. The multiplexed stream, as said, is a time division multiplexed stream formed by a succession of time slots or packets with duration T=(P+H)/R, where P is the number of the data bytes and H is the number of header bytes in each packet.

At the receiving side, after extraction of the system information by block EIS, a demultiplexer DM divides the multiplexed stream into the component elementary streams. These are temporarily stored in demultiplexing (or decoder input) buffers BD1 ... BDi ... BDN (which also may be different areas of a single storage device BD) and supplied to respective decoders DC1 ... DCi ... DCN with the timing set by information (the so-called decoding time stamps) contained in the packets. The decoded streams are then fed to presentation buffers BP1 ... BPi ... BPN and read therefrom with the timing set by the so-called presentation time stamps also contained in the packets.

As has been said in the introduction to this specification, control logic LC of multiplexer MX has to extract data from the individual buffers and to form the packets in such a manner as to avoid data overflow or underflow at the demultiplexing buffers. According to the invention this is obtained by taking into account the fullness of the demultiplexing buffers BD1 ... BDN. To this end the control logic will have access to information contained in the individual streams, as will be better explained hereinafter.

Figure 2:
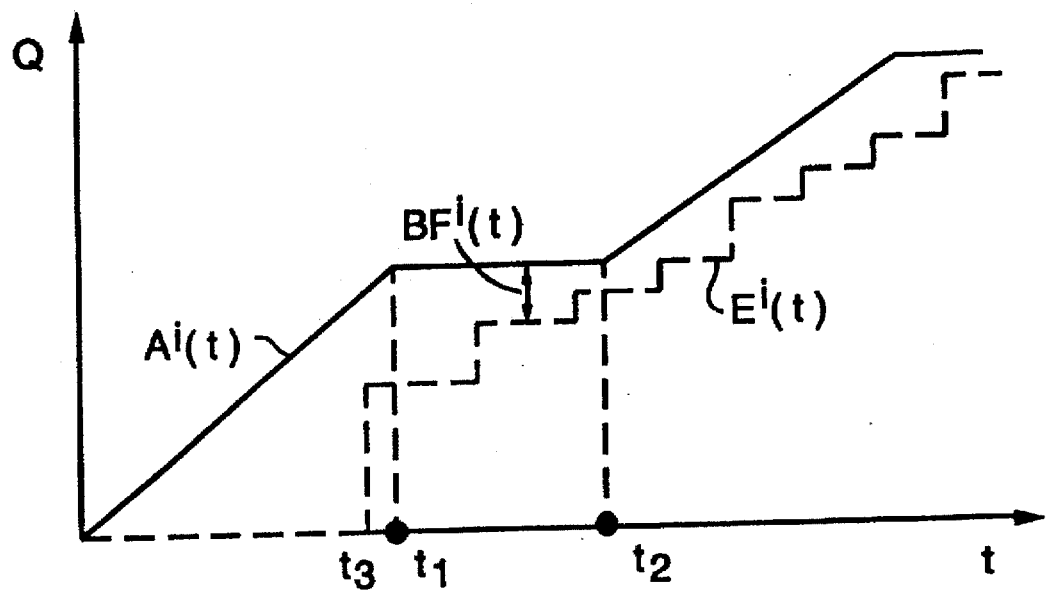
FIG. 2 is a timing diagram of the amount of data in the input buffer of a decoder.

In FIG. 2, the amount of data Q is plotted versus time for a generic elementary stream $S^i$ associated with the generic buffer BDi. In particular, line $A^i(t)$ indicates the trend of the data arrival from demultiplexer DM and line $E^i(t)$ indicates the trend of the data extraction for decoding.

When the multiplexed stream generated by multiplexer MX contains packets of $S^i$, line $A^i(t)$ rises with a slope defined by total bit rate R ($t<t_1$), since the data are sequentially written into BDi. Conversely, when the multiplexed stream contains packets belonging to another elementary stream, no data enters buffer BDi and line $A^i(t)$ is horizontal ($t_1<t<t_2$).

As to the data extraction for decoding, all the data of a so called "access unit" are extracted simultaneously from buffer BDi, as specified in the definition of the model decoder. The term "access unit", as used in standard MPEG1, means the coded equivalent of a set of data to be presented simultaneously, for example a picture in the case of a video stream. Thus, line $E^i(t)$ will be vertical ($t=t_3$) when an "access unit" is extracted, and is horizontal at all other instants.

The amount of data present at every moment in buffer BDi (buffer fullness), indicated in the Figure as $BF^i(t)$, is given by the difference between $A^i(t)$ and $E^i(t)$. If the amount of data extracted exceeds that of the arriving data, then $BF^i(t)$ becomes negative and there is an underflow. If $BF^i(t)$ increases until it exceeds size $C^i$ of buffer BDi, there is an overflow.

Figure 3:
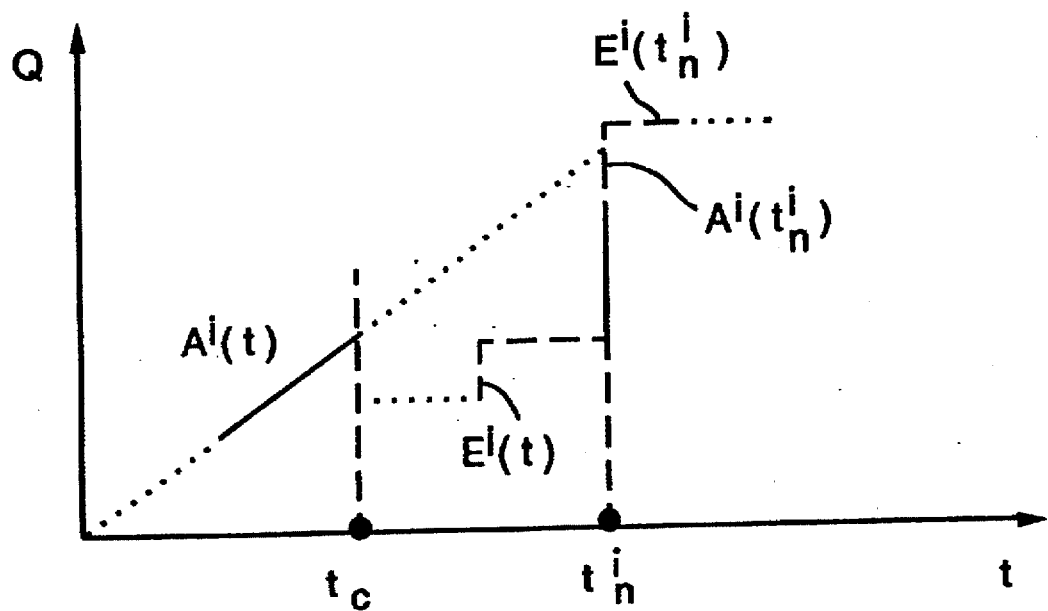
FIG. 3 is a timing diagram highlighting a condition of future underflow.

FIG. 3 represents a condition of "future underflow" for stream $S^i$: at current instant $t_c$ there are no problems, but, assuming the multiplexer output bit rate, and thus the slope of $A^i(t)$, to be constant, there will certainly be an underflow in buffer BDi at an instant $t'_n > t_c$, since $E^i(t'_n)$ exceeds $A^i(t'_n)$.

Figure 4:
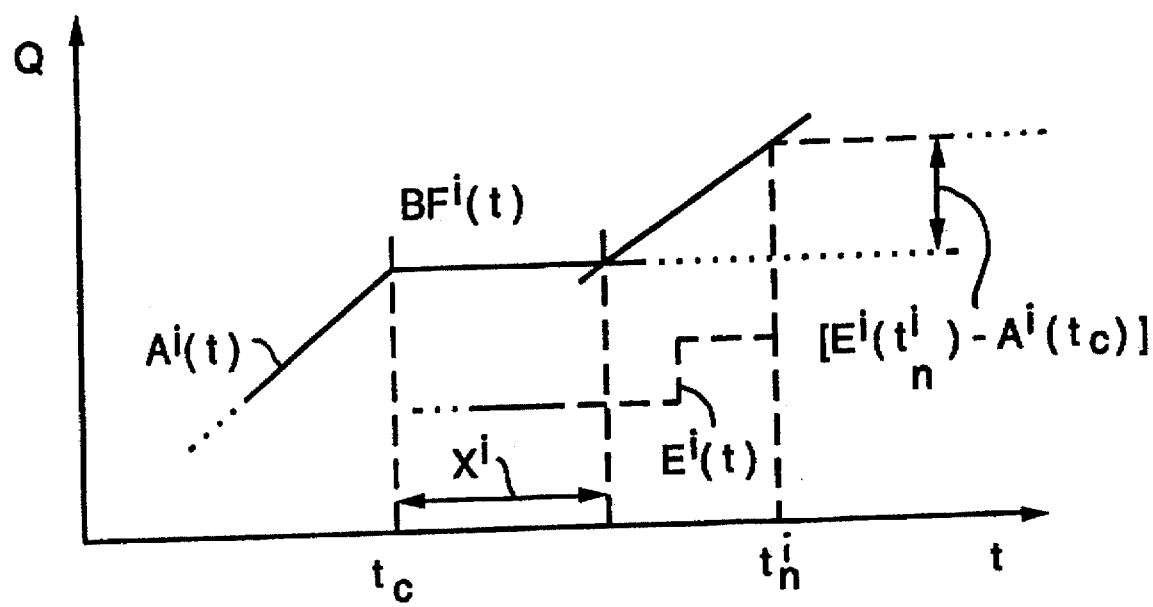
FIG. 4 is a timing diagram where the "relax" quantity is represented.

FIG. 4 shows a quantity $X^i$, hereinafter referred to as the "relax" of the elementary stream $S^i$, which is exploited according to the invention. That quantity is defined as the longest time interval that can elapse, without constructing packets with data of $S^i$, before entering into the "future underflow" condition for $S^i$. In quantitative terms, the relax is given by:

$$X^i = (t'_n - t_c) - [E^i(t'_n) - A^i(t_c)]/R$$

Figure 5:
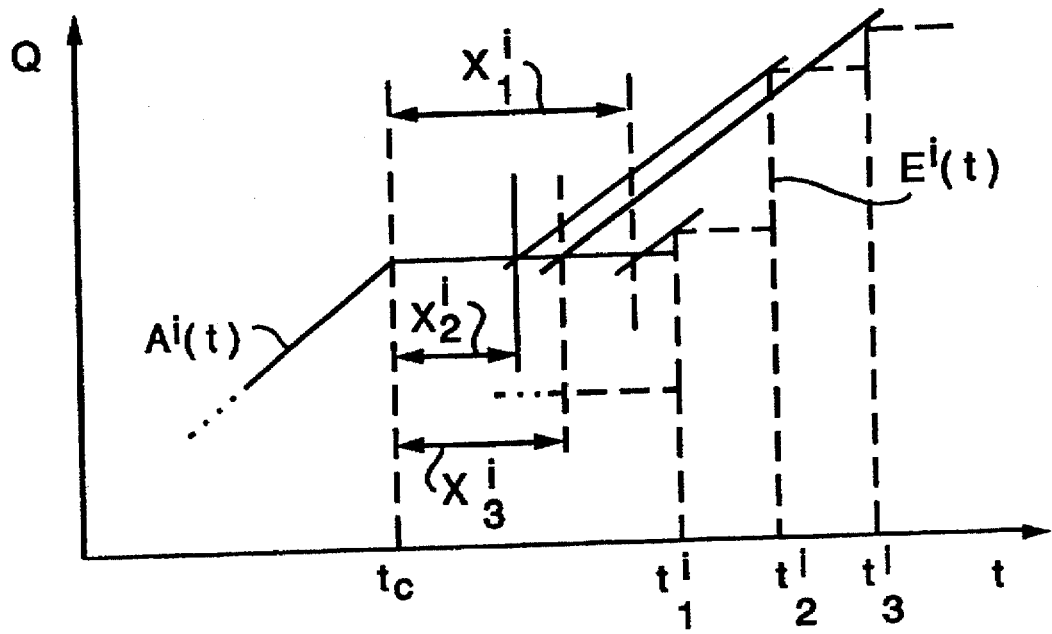
FIG. 5 is a timing diagram where the "relax" quantity is better defined.

FIG. 5 shows that instant $t'_n$, through which the "relax" is defined, is the decoding instant $t'_1, t'_2, t'_3 \ldots$ of one of the next access units to be decoded. Each instant $t'_1, t'_2, t'_3 \ldots$ defines a different relax value $X^i_1, X^i_2, X^i_3, \ldots$; the actual relax for stream $S^i$ will be the smallest among these values, $X^i_2$ in FIG. 5.

In general, without making an exhaustive test, we cannot know which one among the next access units to be decoded defines the actual value of the "relax". In practice, for computing $X^i$, it will be necessary to set a limit K and to consider decoding instants $t'_k$ ($1<k<K$) of the next K access units to be decoded. The relax will be computed according to the formula:

$$X^i = \min \{(t'_k - t_c) - [E^i(t'_k) - A^i(t_c)]/R\}$$

Clearly, the greater K, the better the guarantees of obtaining the actual relax, but the computational load increases too. Simple considerations on the shape of the elementary streams coded according to standard MPEG1 and numerous tests carried out lead to the conclusion that K=3 is a sufficient limit for correctly coded input streams.

We can think of $X^i$ as an indicator of the urgency the demultiplexing buffer BDi has to receive data in order it does not to become empty. The method of the present invention carries out the computation of the relax for each stream $S^i$ to be multiplexed, before the construction of each packet. The packet will contain, in the most usual case, data of the elementary stream that has the smallest relax, i.e. of the stream with the most urgent need to receive data to avoid underflow problems.

As it can be seen, the process aims at preventing underflow conditions. In order to prevent overflow conditions, it is sufficient to check whether the total capacity of BDi is exceeded when adding the amount of data that would be introduced into the packet, to the amount of data $BF^i(t_c)$ currently present. In that case, stream $S^i$ is not taken into consideration for constructing the packet. If none of the streams to be multiplexed can be taken into consideration owing to overflow problems, a fictitious packet (padding packet) without information contents will be transmitted as defined by the standard. The padding packet will be discarded by demultiplexer DM (FIG. 1) without therefore occupying space in the demultiplexing buffers.

Before illustrating the method in detail, it is necessary to make some further remarks.

A first remark concerns the applicability of the method: in order to compute $X^i$ and $BF^i(t_c)$, it is necessary to know the trend of the extractions $E^i(t)$, which are managed by decoder DCi (FIG. 1) allotted to stream $S^i$. Now, these trends are defined solely by the sizes of the various access units (sizes whose values are indicated in the streams to be multiplexed) and by the decoding instants of these units (Decoding Time Stamps, according to the definition contained in the MPEG1 standard), and such information is made available to the multiplexer control logic LC (FIG. 1), as shown by the connection between LC and BM.

Figure 6:
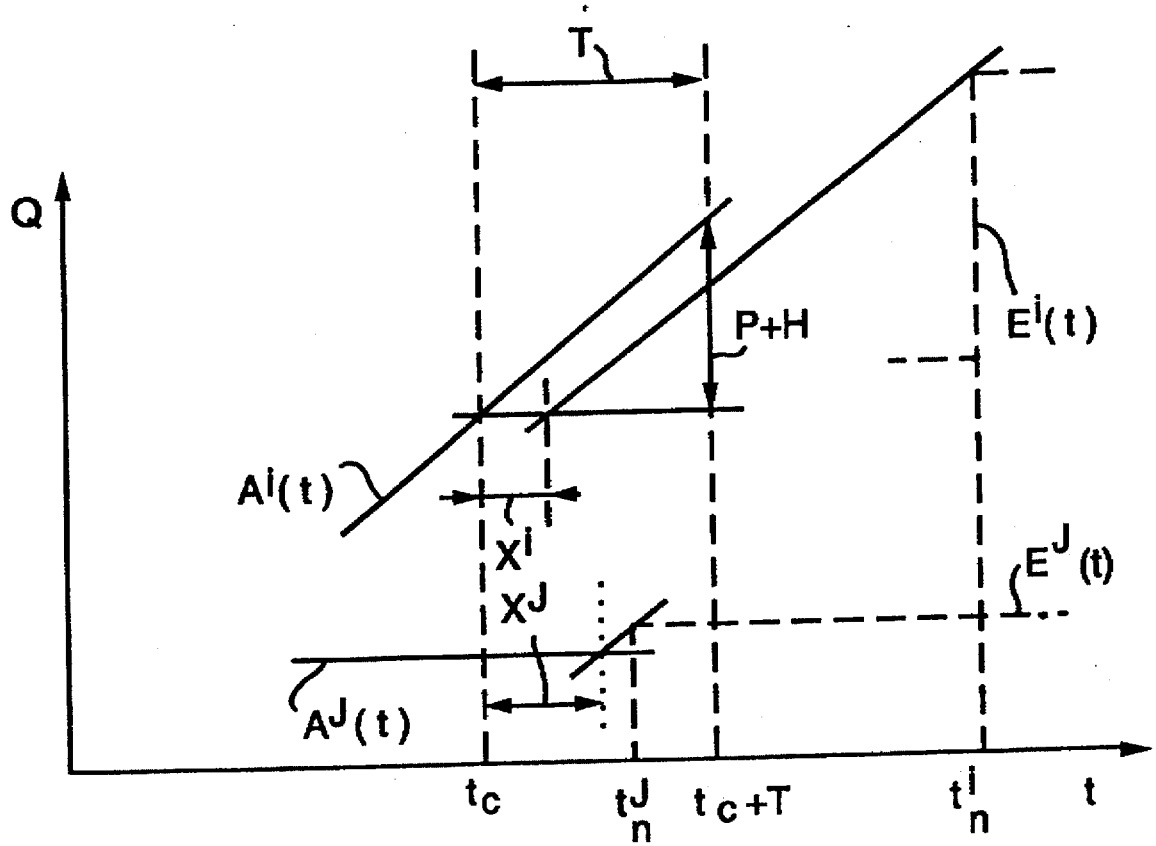
FIG. 6 is a timing diagram where a particular case of underflow condition is highlighted.

A second remark concerns some measures that still are to be taken to avoid underflow problems that could occur in the particular case in which a data stream characterized by extremely small access units (e.g. picture captions) is to be multiplexed together with the video and audio streams. This case is illustrated in FIG. 6, which represents the trends of the arrivals and extractions for two elementary streams $S^i$ and $S^j$.

As can be noted, at current instant $t_c$, $X^i$ is smaller than $X^j$ and, assuming that stream $S^i$ is the stream with minimum relax, the multiplexer should construct the next packet with data of $S^i$. On the other hand, constructing and sending the packet requires a certain time T, proportional to the size P+H of the packet itself, and during that time interval no data of stream $S^j$ can be inserted into the multiplexed stream. Trend $A^j(t)$ of the data loaded into buffer BDj for stream $S^j$ will therefore remain horizontal until instant $t_c+T$ and there will thus be an underflow at buffer BDj. In such a situation, before constructing a packet, it is therefore necessary to insert an additional check. If there is a stream $S^j$ such that:

$$E^j(t_c+T) > A^j(t_c)$$

[where $T=(P+H)/R$]

then the next packet must be built with data of $S^j$ (although the comparison between the relaxes would have indicated stream $S^i$ as the data source to be used) and such packet should have a reduced number of data bytes $P'=E^j(t_c+T)-$ $A^j(t_c)$. In effect, if P was maintained as number of data bytes, underflow for $S^j$ would be avoided, but a future underflow condition for $S^i$ would certainly be entered. In this way instead, provided T'=(P'+H)/R is less than $X^i$, it is possible to avoid emptying the demultiplexing buffers of the decoders of both streams.

The method according to the invention shall now be described in detail. It is structured in steps. The each step, the situation at the current instant $t_c$ is updated and an elementary stream from which to take the data to construct the next packet is chosen.

Some symbols related to quantities of interest, some of which have already been introduced, are defined hereinafter:

N is the number of streams to be multiplexed;

R is the bit rate of the multiplexed stream, kept at a constant value;

P+H is the packet size, where P is a suitable value of the number of data bytes contained in each packet, for instance 2048 bytes, and H is the number of header bytes;

$U^i_h$ is the generic access unit of stream $S^i$, to which a Decoding Time Stamp $t^i_h$ and a size $D^i_h$ are associated;

$C^i$ is the capacity of the demultiplexing buffer BDi of stream $S^i$.

The operations that the multiplexer control logic has to perform at each step are the following. For each input stream $S^i (1<i<N)$, it:

updates at the current instant $t_c$ the quantity of data $E^i(t_c)=\Sigma D^i_h$ (with h such that $t^i_h<t_c$) already extracted from the demultiplexing buffer BDi, updates the next K access units not yet decoded as of the current instant $t_c$;

computes the quantity of data currently contained in the demultiplexing buffer BDi, according to the formula $$BF^i(t_c)=A^i(t_c)-E^i(t_c)$$

if $BF^i(t_c)+P<C^i$, it computes relax according to the formula $$X^i=\min\{(t^i_k-t_c)-[E^i(t^i_k)-A^i(t_c)]/R\}$$

for 1<k<K, where $E^i(t^i_k)=E^i(t_c)+D^i_1+\ldots+D^i_k$ otherwise stream $S^i$ is considered not valid due to overflow problems.

Once these operations are carried out, if no stream is valid due to overflow problems, then a fictitious (padding) packet is constructed, otherwise the following steps are performed:

determining stream $S^I$ with the smallest relax and, in principle, preparing packet with P data bytes using the data of $S^I$;

if the nature of the streams to be multiplexed requires so, checking whether there is a stream $S^j (j \neq I)$ such that $$E^j[t_c+(P+H)/R]>A^j(t_c)$$

and, if $S^j$ exists, replacing stream $S^I$ with syream $S^j$ and reducing the number of data bytes in the packet to be built at this step from P to $$P'=E^j[t_c+(P+H)/R]-A^j(t_c);$$

if S* is the stream chosen at the end of these operations, constructing the packet of size P*+H by using the data of S* and updating the trend of the arrivals to be considered at the next step [instant $t_c+(P^*+H)/R$] according to the formula $$A^*[t_c+(P^*+H)/R]=A^*(t_c)+P^*$$

At instant t=0, $A^i(0)$ is set equal to 0, for each i, for initialization purposes.

Figure 7A:
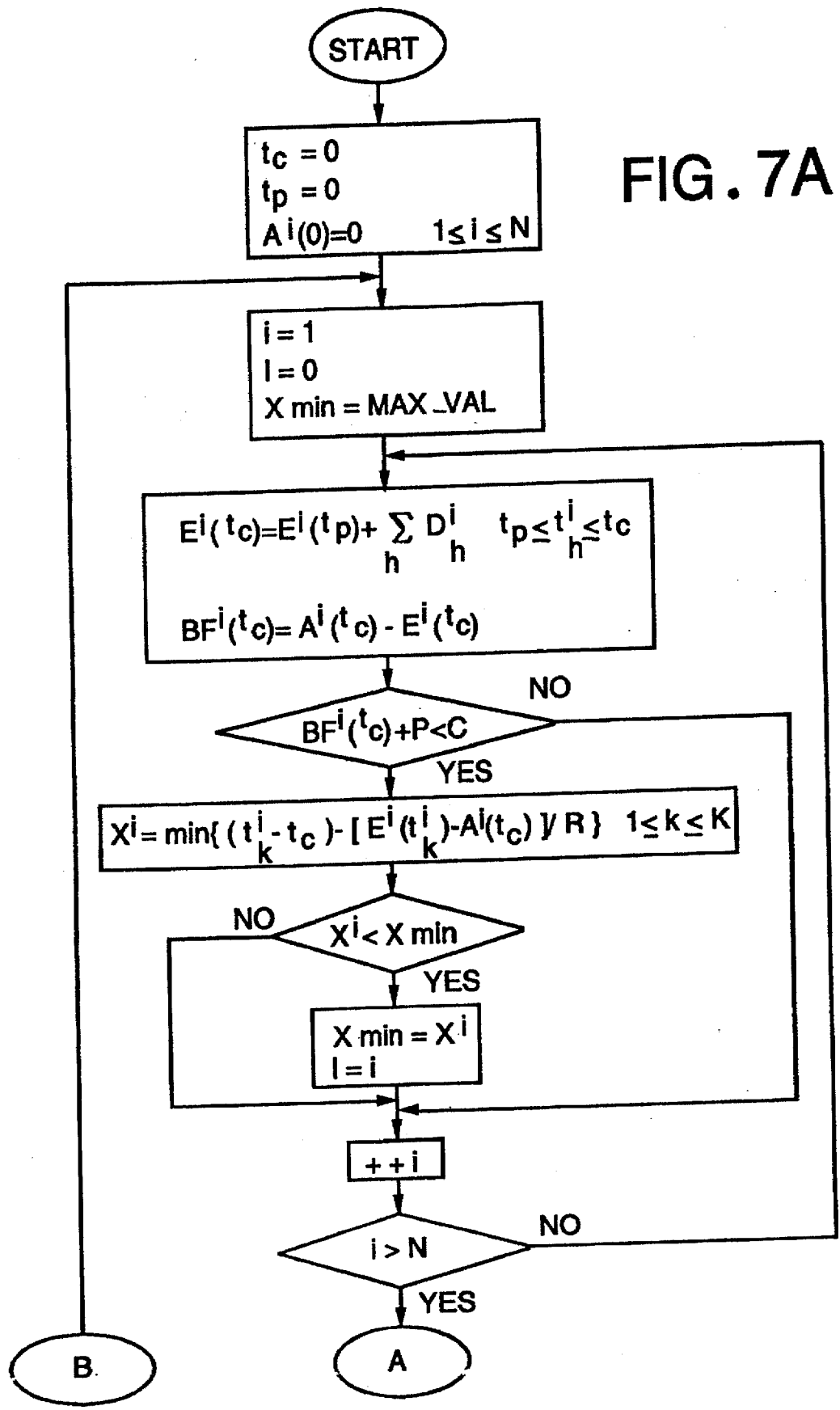
FIGS. 7A and 7B are a flow chart of the method of the invention.
Figure 7B:
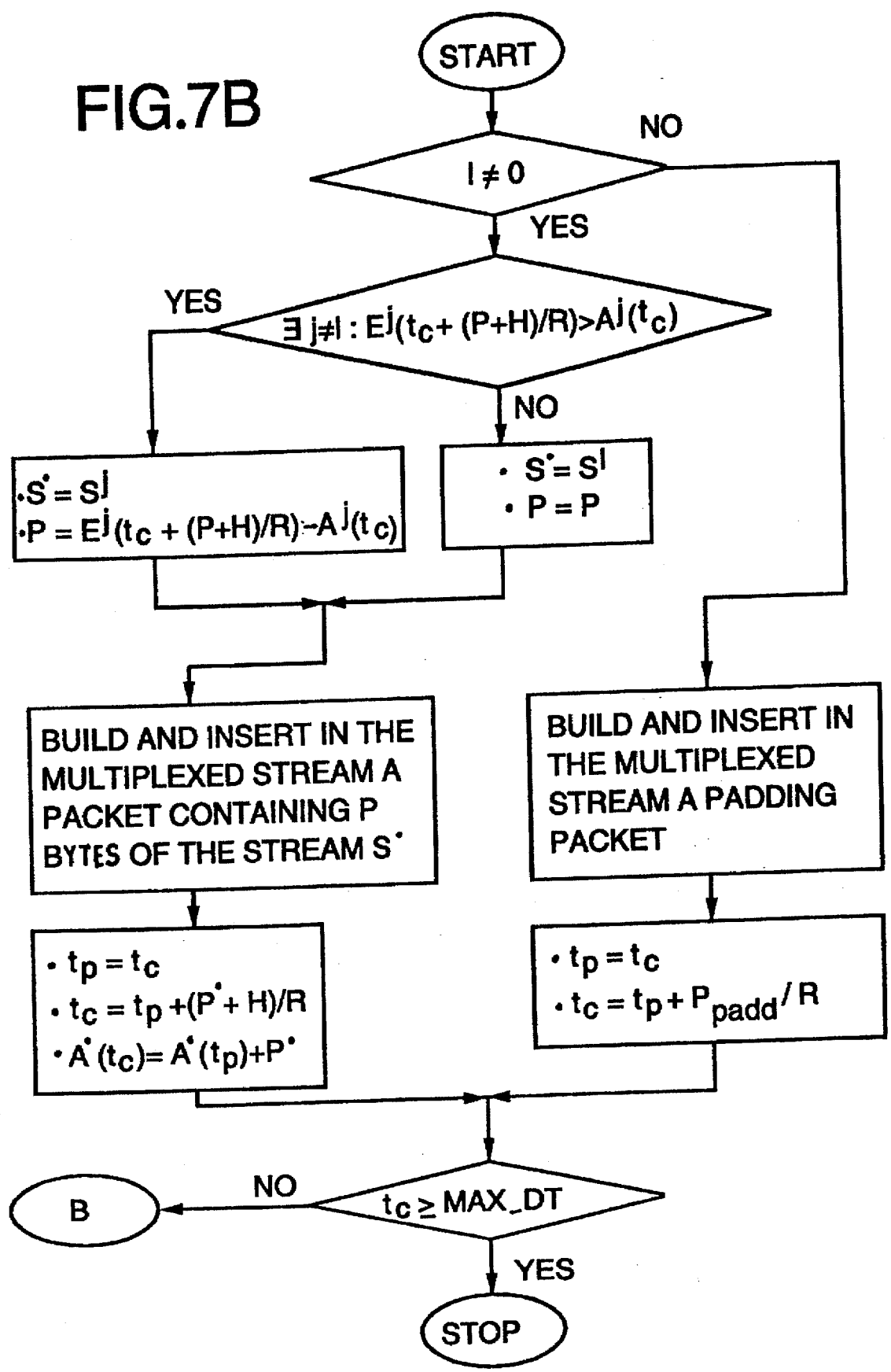

The method is also illustrated in the flow-chart of FIGS. 7A, 7B, which consider the most complex situation where the further check on the existence of stream $S^j$ is performed. In the flow charts, for reasons linked with the practical machine implementation of the method, an initial maximum value MAX_VAL has been set for the relax and a maximum duration MAX_DT has been set for the multiplexing process. Moreover, for sake of simplicity, parameter $t_p$ has been introduced for denoting the previous multiplexing instant. The flow charts do not require further explanations.

It is evident that what has been described is provided solely by way of non-limiting example. Variations and modifications are possible without departing from the scope of the invention.

We claim:

1. A method of multiplexing N elementary streams of digitally coded data representing information associated to multimedia signal sequences, to build a multiplexed stream which is composed of packets containing data from a single stream and is transmitted at a bit rate R to a remote demultiplexer (DM) capable of driving N decoders (DC1 . . . DCN), each decoder being allotted to one of the elementary streams and being connected downstream of a respective demultiplexing buffer (BD1 . . . BDN), into which data of a packet are sequentially written and from which blocks of coded data of size $D^i_h$ hereinafter referred to as access units are simultaneously extracted at decoding instants $t^i_h$, comprising the following steps for each input stream $S^i$:

a) evaluating, at a current instant $t_c$, the amount of data $A^i(t_c)$ already arrived at the demultiplexing buffer (BDi) and the amount of data $E^i(t_c)$ already extracted from the demultiplexing buffer (BDi), where $E^i(t_c)=\Sigma D^i_h$, h being such that $t^i_h<t_c$;

b) evaluating the amount of data $BF^i(t_c)$ contained at said current instant $t_c$ in the demultiplexing buffer (BDi) as the difference $BF^i(t_c)=A^i(t_c)-E^i(t_c)$ between the data arrived and the data extracted up to instant $t_c$;

c) evaluating for each of a number K of next access units not yet decoded at said current instant $t_c$, a parameter $X^i$ defined after referred to as a "relax" linked to the buffer occupancy level and representative of the urgency the buffer (BDi) has to receive data to avoid occurrence of underflow conditions upon extraction of one of said access unit;

d) identifying stream $S^I$ having the minimum relax;

e) constructing a packet containing a predetermined number P of data bytes of said elementary stream $S^I$ having the minimum relax.

2. The method according to claim 1 wherein the relax $X^i$ for stream $S^i$ is evaluated according to relation $$X^i=\min\{(t^i_k-t_c)-[E^i(t^i_k)-A^i(t_c)]/R\},$$

where:

min indicates the minimum of the quantity between braces;

$t^i_k$ (1>k>K) is the extraction instant of the k-th next access unit and $E^i(t^i_k)$ is given by $E^i(t_c)+\Sigma D^i_m$ (m<1<k).

3. The method according to claim 1 wherein, after identification of the stream $S^I$ having the minimum relax, a check is made on whether buffer underflow conditions would occur, for another elementary stream $S^j$ of which the relax is higher than the minimum, during a time interval starting at said current instant $t_c$ and having a duration (T) equal to the time required to transmit a packet containing P data bytes and H header bytes at bit rate R, and in that said packet containing said predetermined number P of data of the elementary stream $S^I$ having the minimum relax is built if said check has given negative result, whereas a packet containing a reduced number P' of data bytes of said other elementary stream $S^j$ is built if said check has given positive result.

4. The method according to claim 3 wherein said reduced number P' is such that the time T' required to transmit a packet of size P'+H at bit rate R is less than the minimum relax.

5. The method according to claim 4 wherein said reduced number P' is $P'=E^j[t_c+(P+H)/R]-A^j(t_c)$.

6. The method according to claim 1 wherein the relax evaluation for an elementary stream is carried out only if writing a packet containing data of that stream into the demultiplexing buffer does not cause overflow in the buffer itself.

7. The method according to claim 6 wherein, if overflow would occur for all streams, a padding packet without information content is built and inserted into the multiplexed stream.

8. The method according to claim 1 wherein, after construction of a packet at instant $t_c$, said evaluations are repeated at an instant $t_c+(P^*+H)/R$, $P^*$ having value P or P' depending on whether the packet itself has been built with data of the stream $S^I$ with minimum relax or of said other stream $S^j$.

9. The method according to claim 1 wherein instant t=0, $A^i(0)$ is set to 0, for each i, for initialization purposes.

10. The method according to claim 1 wherein said number K of next access units not yet decoded as of the current instant $t_c$ is 3.

11. The method according to claim 1 wherein said predetermined number P of data bytes in the packet is about 2048.

12. The method according to claim 1 wherein said streams are coded according to standard ISO/IEC 11172 (standard MPEG1).

* * * * *